United States Patent [19]

May

[11] Patent Number: 4,571,840
[45] Date of Patent: Feb. 25, 1986

[54] DEPTH-OF-CUT GAUGE

[76] Inventor: Jim May, 10751 SE. 258th Pl., Gresham, Oreg. 97030

[21] Appl. No.: 639,342

[22] Filed: Aug. 10, 1984

[51] Int. Cl.⁴ .......................... G01B 3/22; G01B 5/00
[52] U.S. Cl. .................. 33/185 R; 33/169 B; 33/42; 83/471.2
[58] Field of Search ............... 83/881, 522, 471.2, 83/745, 802, 443, 446, 441; 33/169 B, 185 R, 180 R, 42; 30/381, 383

[56] References Cited

U.S. PATENT DOCUMENTS

| | | | |
|---|---|---|---|
| 3,205,586 | 9/1965 | Mullen | 33/185 R |
| 3,398,771 | 8/1968 | May | 83/471.2 |
| 3,479,743 | 11/1969 | Zemberry | 33/169 B |
| 3,548,896 | 12/1970 | Larsen | 83/745 |
| 4,185,382 | 1/1980 | Rawlinson | 30/383 |

Primary Examiner—Harry N. Haroian
Attorney, Agent, or Firm—Eugene M. Eckelman

[57] ABSTRACT

A gauge member has an abutment edge at one end for engaging a workpiece in establishing a depth of cut and is mounted in a holder on an adjustable working member. A spring urges the gauge laterally of the frame to position the abutment edge toward a workpiece but allows the gauge to be swung out of the way by a carriage as the latter passes by. The gauge is pivotally jointed intermediate its ends whereby to be capable of partially folding and releasing the abutment edge from a stuck position in a workpiece. A spring connects the jointed portions of the gauge and such spring in combination with the pivot for the joint maintains the sections in longitudinal alignment but allows the sections to partially fold and allow the abutment edge to free itself from the wood.

3 Claims, 5 Drawing Figures

U.S. Patent  Feb. 25, 1986  4,571,840
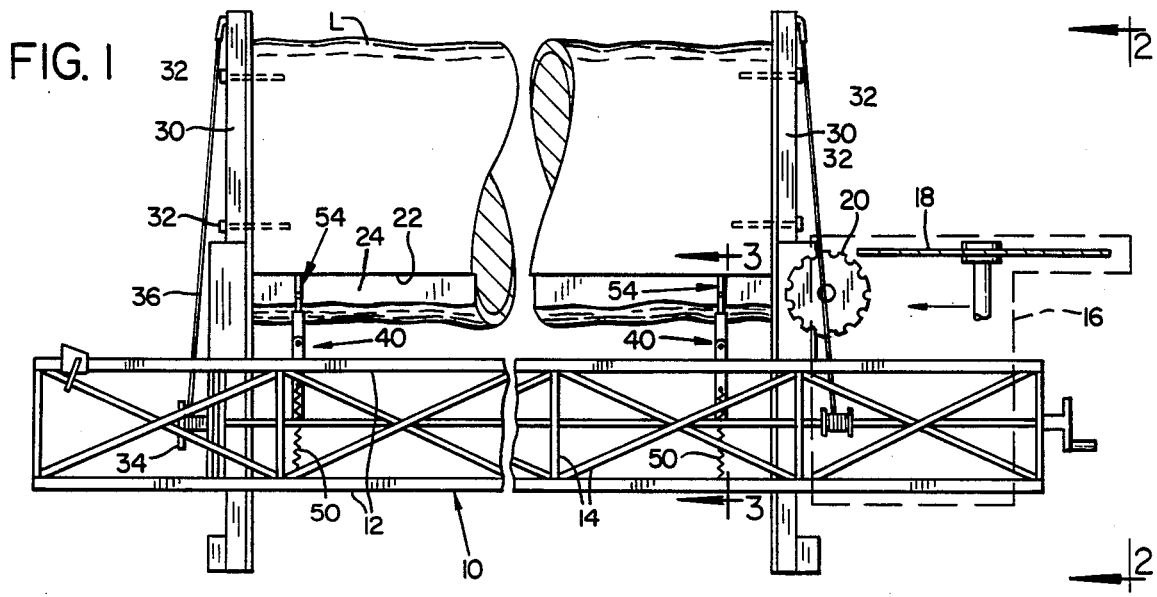
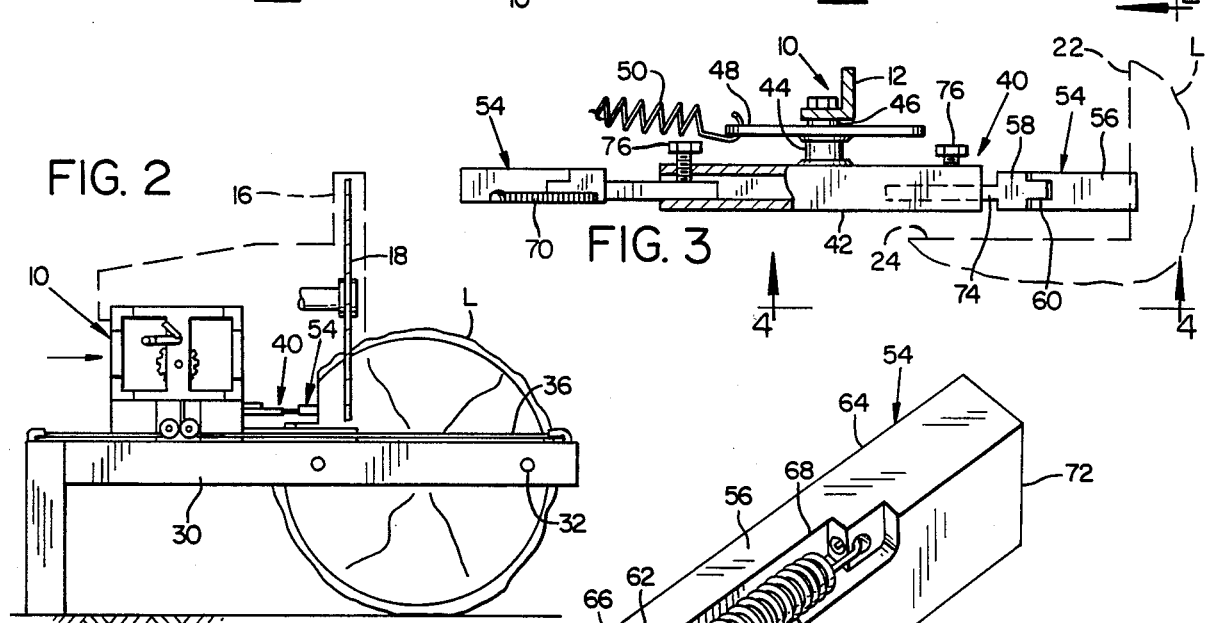
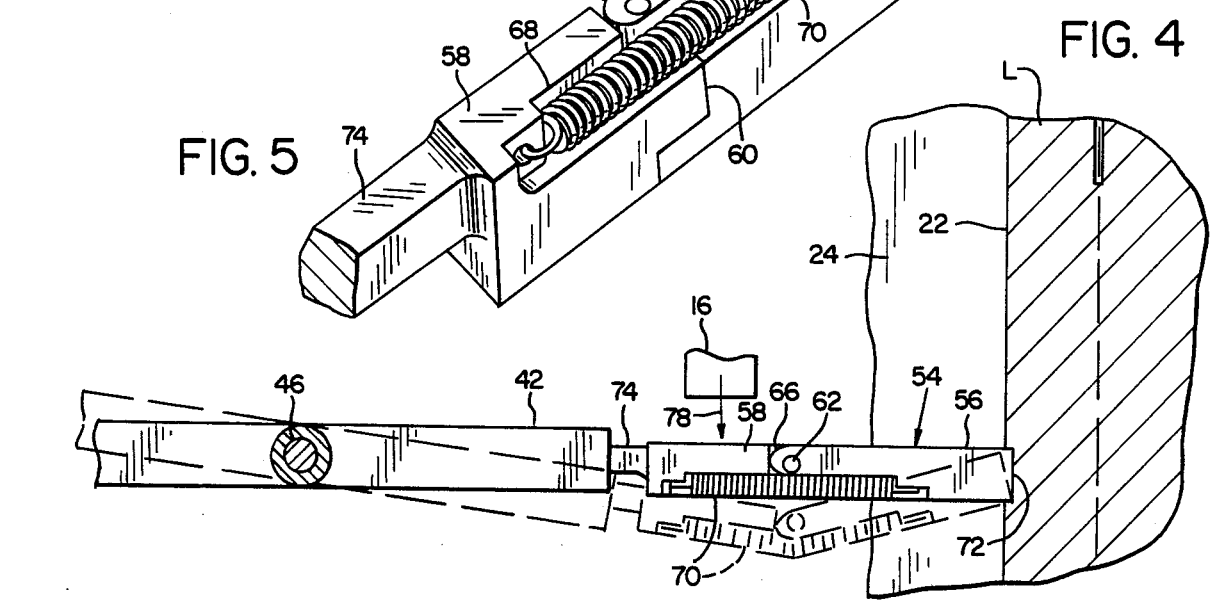

DEPTH-OF-CUT GAUGE

BACKGROUND OF THE INVENTION

This invention relates to new and useful improvements in depth-of-cut gauges for sawmills, milling machines, power hacksaws, and other work members.

A similar purpose gauge has heretofore been utilized on portable type sawmills of the type having a supporting frame, a saw carriage movable longitudinally on the frame, means supporting the frame parallel with a log, and means arranged to adjust the frame laterally of the log for positioning the saw carriage in a selected depth-of-cut for the saw blade. Such a sawmill and depth-of-cut gauge is shown in U.S. Pat. No. 3,398,771. The gauge comprises a pivoted holder for an arm having an abutment end arranged to engage a log for laterally positioning the frame in a depth of cut of the log. The type of depth-of-cut gauge shown in U.S. Pat. No. 3,398,771 has the disadvantage that it frequently becomes stuck in the wood and is not capable of pivoting to an out-of-the-way position when the saw carriage engages it. That is, the abutment edge of the gauge frequently embeds itself into the wood due to the impact it has when the saw frame is adjusted laterally, and although it has a pivoted support, the radius of pivotal movement will not allow the abutting edge to free itself from the wood. Thus, when the carriage engages this arm, it will, as stated, bend and thus require repair or replacement. The same problem exists on other work members where a depth gauge is used to stop lateral adjustment of a carriage or the like.

SUMMARY OF THE INVENTION

According to the present invention and forming a primary objective thereof, a depth-of-cut gauge is provided which is pivotally jointed intermediate its ends whereby to be capable of partially folding and releasing its abutment edge from a stuck position in a workpiece.

In carrying out the invention, a gauge member is pivotally mounted on the frame of a work member and is biased in a position such that an abutment edge thereof is extended toward the workpiece. The gauge has an arm member which is pivotally jointed intermediate its ends such that when engaged by a moving carriage it can partially fold and release the abutment edge from a stuck position in a workpiece. The jointed arm member comprises at least two sections including spring means arranged to normally position the sections in longitudinal alignment. The spring is set in cut-out portions in the two arm sections so as to be disposed inward of adjacent surfaces of the arm sections for protection.

BRIEF DESCRIPTION OF THE DRAWINGS

FIG. 1 is a foreshortened plan view of a sawmill and a log being sawed, this view showing the present depth-of-cut gauge in position for positioning the saw frame for a saw cut;

FIG. 2 is an end elevational view taken on the line 2—2 of FIG. 1;

FIG. 3 is an enlarged cross sectional view, partly broken away showing the present depth of cut gauge;

FIG. 4 is an enlarged bottom plan view of the gauge and showing operation thereof in clearing itself from the log; and FIG. 5 is an enlarged fragmentary perspective view of a portion of the gauge.

DETAILED DESCRIPTION OF A PREFERRED EMBODIMENT

With reference first to FIGS. 1 and 2, the present invention is shown in conjunction with a portable sawmill wherein the main frame of the sawmill is anchored securely to a log L, or vice versa, and successive cuts are made longitudinally of the log by lateral adjustment of a saw carriage support frame. The numeral 10 designates generally a conventional elongated saw carriage frame having longitudinal frame members 12 and suitable vertical and angled reinforcing frame members 14. Frame 10 supports a movable carriage, shown by broken lines 16, and this carriage carries a vertical saw blade 18 and one or more horizontal saw blades 20. Blades 18 and 20 cooperate upon longitudinal movement of the carriage frame 16 to provide vertical and horizontal cuts 22 and 24 respectively on the log.

Temporary connection between the frame 10 and the log L is accomplished by laterally disposed rail members 30 secured, as by lag screws or spikes 32 or other suitable means 32 to the log. Winch means 34 with cables secured to the far end of the rail members 30 are used to adjust the frame 10 toward the log after each cut. The structure thus far described is conventional.

The invention resides in an improved depth-of-cut gauge 40 attached to the frame 12 and arranged to abut the vertical saw cut 22 to position the frame 10 in a proper depth of cut for the saw carriage 16.

With reference also to FIGS. 3, 4 and 5, the present gauge comprises a tubular holder 42 having an integral boss 44 on its upper side. This holder has a rotatable shaft support 46 on a frame member 12 of the frame 10 on the side of the frame adjacent to the log. Integral with the boss 44 is a lever arm 48 adapted for removable engagement by one end of a spring 50 connected at its other end to the frame 10 on the far side of the latter from the log and arranged to normally maintain the holder 42 substantially at a right angle to the frame 10. The lever arm 48 can extend on each side of the boss 44, as seen in FIG. 3, and as will be more apparent hereinafter, the spring can be connected to either end of the lever arm to reverse the position of the holder 42.

Holder 42 removably supports a gauge arm 54 made up of two sections 56 and 58 disposed in end to end relation. The adjacent ends of these two sections have a tongue and groove fit 60 with a vertical pivot pin connection 62 offset toward a saw carriage engaging side 64 thereof. Adjacent tongue and groove portions on the saw carriage engaging side of the arm 54 are cut away, or rounded, as designated by the numeral 66 whereby the two arm sections are free to pivot relative to each other in the one direction. The two arm sections cannot, however, pivot in the other direction since the tongue and groove portions of the joint are not cut away or rounded on the opposite side and abut each other in the aligned position of the two sections.

The arm sections are each provided with a recess 68 extending across the joint 60 which receives a tension spring 70 connected at its opposite ends to the respective arm sections. This spring is disposed on the opposite side of the pivot 62 from the saw carriage engaging side 64. The spring 70 normally maintains the arm sections 56 and 58 in alignment with each other but allows the pivotal action in the one direction to take place.

This spring also returns the arm sections back into alignment after such a pivoted movement.

Arm section 56 has a free end edge 72 which serves as an abutting edge for the depth-of-cut gauge and the arm section 58 has an extension 74 of a size and shape to fit holder 42. A removable, locked engagement of the extension 74 is provided by means of a setscrew 76 on the holder 42.

With particular reference to FIG. 4, operation of the present gauge is shown in plan. This view shows a slight embedding of the abutting end edge 72 in the vertical cut 22 of the log, as might occur when the frame 10 is adjusted for a new cut. As the saw carriage 16 moves in the direction of arrow 78, FIG. 4, it is clear that the radius of pivot of the arm and holder around shaft 46, would, without the present jointing of the arm 54, require that the abutting edge 72 be torn out of the wood when engaged by the saw carriage. As stated hereinbefore, the arm is frequently bent and must be repaired or replaced. The capability of the arm to break or partially fold, as shown in broken lines in FIG. 4, allows it to readily free the abutting edge 72 from the wood.

As best seen in FIG. 3, the holder 42 is symmetrical and an arm 54 can be mounted in either end if desired. Also, if desired, each end can be supplied with one of the depth-of-cut gauges and positioned at selected projecting dimensions so that different cuts can be accomplished by reversing the holder 42 end for end. Such reversal is readily accomplished by disconnecting the spring 50 from the one end of the lever arm 48 and reconnecting it to the opposite end.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A depth of cut gauge for working members of the type having a supporting frame, a carriage movable longitudinally on said frame, means supporting said frame longitudinally of a workpiece, and means arranged to adjust said frame laterally of the workpiece for positioning the carriage in a depth of cut on the workpiece said gauge comprising an arm member having opposite ends, one end of said arm member comprising an abutment edge for engaging a workpiece in establishing a depth of cut, mounting means on said arm member arranged to pivotally mount it on a supporting frame of a working member, and biasing means urging said arm member laterally of the frame of a working member to position said abutment edge toward a workpiece but to allow said arm member to be swung out of the way of a carriage as the latter passes by, said arm member being pivotally jointed intermediate its ends whereby to be capable of partially folding and releasing said abutment edge from a stuck position in a workpiece.

2. The gauge of claim 1 wherein said arm member comprises at least two sections connected pivotally, and spring means arranged to normally position said sections in longitudinal alignment.

3. The gauge of claim 2 wherein said sections include longitudinal cut-out portions disposed in alignment for receiving said spring means and disposing said spring means inward of adjacent surfaces of said sections.

* * * * *